April 21, 1942.  H. DREYFUS  2,280,482
TRANSPARENT CLOSURE AND THE LIKE
Filed Jan. 31, 1939
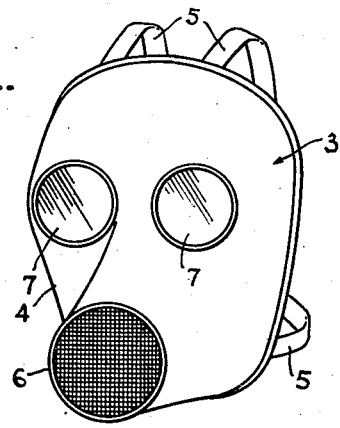
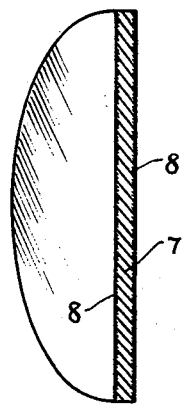
INVENTOR
Henry Dreyfus
BY
ATTORNEYS Patented Apr. 21, 1942

2,280,482

UNITED STATES PATENT OFFICE 2,280,482

TRANSPARENT CLOSURE AND THE LIKE

Henry Dreyfus, London, England, assignor to Celanese Corporation of America, a corporation of Delaware Application January 31, 1939, Serial No. 253,810
In Great Britain February 8, 1938

12 Claims. (Cl. 2—14)

This invention relates to transparent closures and the like and especially to respirator eye-pieces and other transparent closures which are required to remain transparent under conditions in which they would normally become obscured by the condensation of moisture upon them, and to sheet materials employed in making such closures and to the production of such sheet materials.

Respirator eye-pieces are subjected in use to a moist, warm atmosphere on the inner side and to a colder atmosphere on the outer side. In consequence they tend to become obscured by the condensation of moisture on the inside. I have found that this disadvantage can be avoided by making the eye-pieces from material obtained by saponifying sheet material of cellulose acetate or other water resistant saponifiable film-forming material so as to provide at least one surface which is capable of absorbing moisture while maintaining in the sheet material as a whole an adequate degree of transparency and resistance to penetration by water and gases. "Adequate" means adequate for the purpose for which the eye-piece or other closure is designed. Thus in the case of respirator eye-pieces complete resistance to penetration by gases for an indefinite period is not required and the invention is not limited to products giving such protection.

In addition to respirators having eye-pieces of the saponified material the invention includes other articles having a window and such that when in use said window is liable to be exposed on one side to a moist warm atmosphere and on the other side to a colder atmosphere, said window having a transparent closure of material formed as described above.

A convenient way of carrying out the invention is to form a sheet of cellulose acetate of the desired thickness and flatness, subject this sheet to the desired saponification and cut or punch the eye-piece discs from the so-treated sheet. An alternative method having the advantage that the waste left after cutting is more readily utilisable is to form the sheet into the desired shape and then saponify. The thickness of the sheet material will depend on the purpose which the closure is to serve.

Thus for respirator eye pieces sheets of thickness between 0.003" or 0.004" and 0.010" or 0.015" are suitable. Thicker material can also be used for this purpose and is particularly suitable for larger windows. Thus for example for aeroplane windows thicknesses between 0.03" and 0.1" e. g. 0.04–0.08" have been used with advantage.

The sheet material, especially the thinner gauges, can be made by flowing or extruding a composition containing cellulose acetate and a plasticiser dissolved in a volatile solvent on to a travelling film-forming surface, for example the surface of an endless driven metal band, and effecting evaporation of the volatile solvent during the travel of the surface. An alternative method which is preferable for the heavier gauges, is to build up the sheet from which the closures are to be made, by spraying on to a suitable surface a solution of the cellulose acetate, which may with advantage contain in addition to the volatile solvent and the plasticiser for the cellulose acetate, one or more high boiling solvents for the cellulose acetate, for example ethyl lactate or diacetone alcohol, and one or more medium boiling non-solvents, for example methanol or ethanol. A further method, also suitable for the thicker sheets, is to form the sheet in a block press from powdered cellulose acetate and a plasticiser. Thus, for example, a paste may be made from the powdered cellulose acetate, plasticiser and a volatile solvent such as acetone, with or without high boiling solvents; this may be formed into a cake, consolidated in a heated press, cut into sheets which are then seasoned to remove residual solvent and finally polished by a further hot pressing or like operation.

The plasticiser should not be readily removable by the saponifying bath. At the same time it should preferably have at least some slight degree of affinity for water. Thus, highly water-resistant plasticisers such, for example, as tricresyl phosphate and tributyl phosphate are preferably employed, if at all, only in admixture with plasticisers having a greater affinity for water, for example dimethyl phthalate, dimethyl-, diethyl- and dibutyl-tartrates. Plasticisers which are readily dissolved by alkali such, for example, as para-toluene sulphonamide should be avoided. Among plasticisers which, without being highly water-resistant, are sufficiently stable towards dilute solutions of alkali are, for example, dimethyl phthalate, dimethoxyethyl phthalate, diethoxyethyl phthalate, dioxyethyl phthalate, ethyl(ethoxyethyl)phthalate, ethly(oxyethyl)phthalate and ethyl acetanilide.

Preferably saponification is intense at the surface of the material but does not extend far below the surface. Thus a greatly improved resistance to dimming can be obtained by a saponification of cellulose acetate sheet material which imparts an affinity for cotton dyes to the material to a depth of between 0.001" and 0.005" from the surface and some degree of resistance to dimming can be obtained even with a saponification which is still more superficial, e. g. between 0.0001" and 0.0005" or between 0.0005" and 0.0001". On the other hand, provided the material be sufficiently thick, it may be intensely saponified (i. e. saponified sufficiently to give an affinity for cotton dyes) to a much greater depth, e. g. 0.01" to 0.05" or even more.

Saponification which is intense at the surface and does not extend to any substantial depth below the surface can readily be effected without undesirably diminishing the transparency of the material or reducing its impermeability to moisture and gases. These advantages are less easily obtained when saponification is deep seated.

One or both sides of the sheet may be saponified. Saponification of both sides is usually of advantage in assisting to maintain the flatness of the eye-piece or the like when this is exposed to a moist atmosphere. The saponification can, however, be confined to one side, for example by means of a coating of wax or other coating material which is sufficiently resistant to the saponifying agent and can subsequently be removed from the sheet material.

The sheet material may be saponified by immersion in a bath containing an aqueous solution of caustic soda, for example a 1 or 2 to 3 or 4% solution. Other alkaline saponifying agents may be employed, for example caustic potash, barium hydroxide, alkali metal salts of pronounced alkaline reaction such as sodium and potassium carbonate and trisodium phosphate, ammonia and other nitrogenous bases such as tetramethylammonium hydroxide, trimethyl benzyl ammonium hydroxide and guanidine. Saponifying agents which tend to produce deep-seated saponification, e. g. moderately strong bases with a pronounced swelling action on the cellulose ester such as the methylamines, ethylamines, ethanolamines, benzylamines, ethylene diamine and cyclohexylamine are preferably employed, if at all, in low concentrations and in the presence of substances adapted to repress swelling, e. g. salts such as sodium acetate and sodium sulphate. Such swelling repressing agents may also be present even when the saponifying agent is of the kind which shows little tendency to produce deep-seated saponification. The best results have been obtained by saponifying at low or medium temperatures, for example 15–30 or 40° C.

Swelling agents and solvents (in appropriate dilution) may be present in the saponifying bath. Thus for cellulose acetate sheet materials solvents such as acetone, dioxane and methylene ethylene ether and swelling agents such as methanol and ethanol may be present. Care must, however, be taken when using such agents that the conditions are not such as to damage the material e. g. by destroying its transparency. Thus, I have found that with a 2–3% solution of caustic soda in 30–50% aqueous ethanol at about 20° C. an improvement in resistance to dimming without undesirable decrease in transparency can be obtained in less than one minute, e. g. in 15–30 seconds, but that the higher the concentration and temperature with such solutions the more difficult it is to retain the desired transparency.

After saponification, the sheet is washed to remove excess of the saponifying bath and is further treated if necessary to remove any plasticiser, or any by-products of saponification, left on the saponified surface of the material. Such treatment may take the form of buffing with a wet chamois leather buff and/or further washing with a powerful jet of water. The sheet material saponified may be flat, curved or flexible according to the shape desired in the closure.

The cellulose acetate employed should preferably have been made by acetylation under such conditions that substantial degradation of the cellulose molecule is avoided, followed by ripening to acetone solubility, for example to an acetyl value of 51 or 52 to 53 or 54% calculated as acetic acid. With a view to avoiding substantial degradation of the cellulose during acetylation the temperature should be carefully controlled and it is of advantage to carry out acetylation in the presence of a large excess of inert diluent, for example acetic acid. Ripening may be carried out until the cellulose acetate, although insoluble and resistant to liquid water, is nevertheless soluble in acetone diluted to a considerable extent with water as described in U. S. application S. No. 225,570 filed August 18, 1938. Similar solubility properties are obtainable by allowing the temperature to rise during acetylation so that the cellulose molecule is to some extent broken down, or a pretreatment of the cellulose from which the acetate is to be made, for example with mineral acids, formic acids or mixtures thereof with acetic or other lower fatty acids. In general the lower the acetyl value and the more developed is the tendency towards solubility in aqueous mixtures the milder should be the conditions of saponification to maintain transparency and impermeability and water resistance.

The following examples illustrate the invention:

Example 1

Transparent sheet material of thickness 0.04–0.08", formed of cellulose acetate of acetyl value between 52 and 56 calculated as acetic acid and containing dimethyl phthalate as plasticiser is shaped into discs of appropriate size for use as respirator eye-pieces.

The discs are passed in the course of 1–2 hours through a bath through which flows a counter-current of aqueous caustic soda the average concentration being 2–3% and the temperature between 20 and 30° C.

This discs leaving the saponifying bath are well washed with very dilute hydrochloric acid and subsequently with water. They are then buffed on both sides with a damp chamois leather buff to remove any residual decomposition products or plasticiser from the surface without, however, abrading the surface and are then dried after which they are ready to be fitted into position in the respirator.

Instead of dimethyl phthalate, dimethyl ethyl phthalate or ethyl-(ethoxyethyl)-phthalate can be used.

Example 2

The process is carried out as in Example 1 except that an 8% solution of caustic soda at 40° C. for 3 or 4 minutes is employed.

In a similar way observation panels for aircraft or land vehicles can be made from suitably shaped blanks.

Instead of cellulose acetate, other water-resistant saponifiable transparent film-forming substances can be employed. Among the most useful of such substances are other organic esters of cellulose, for example cellulose propionate, butyrate, cellulose acetate-propionate, cellulose acetate-butyrate, cellulose acetate-nitrate, cellulose propionate-nitrate, cellulose butyrate nitrate, ethyl cellulose acetate and oxyethyl cellulose acetate. It is preferred to use organic esters of cellulose containing 2–2½% acidyl groups per $C_6H_{10}O_5$ unit of cellulose. Mention may also be made of polymerised vinyl acetate and like film-forming polymerised esters of unsaturated compounds, for example polyvinyl chlor-acetate, polyvinyl acetate chloride and the polymeric acrylic and alkyl substituted acrylic esters, for instance poly-(ethyl acrylate) and polymethyl poly-(methyl methacrylate).

*Example 3*

Sheet material as used in Example 1 is shaped into discs which are arranged on racks in a closed vessel. Into this is run 28% aqueous ammonia to cover the discs. The bath is kept at a constant temperature between 15 and 30° C. for 4 to 2 hours according to temperature. The ammonia is then run off and replaced by water. When the discs have been well washed with water they are buffed and dried as described in Example 1.

Lower concentrations of ammonia, e. g. 10–20 or 25%, can be used, preferably at higher temperatures and/or for longer periods. On the other hand still higher concentrations of ammonia can be used at higher pressures.

Although the process and products of the invention are of particular importance in connection with the manufacture of respirator eye-pieces, goggles and the like, they have other applications, for example in the production of wind-screens or windows for closed vehicles, aircraft, gun turrets and the like. The products of the invention are capable of remaining undimmed for considerable periods even when exposed on one side to a saturated atmosphere at blood heat and on the other to a winter atmospheric temperature. The invention includes articles provided with eye-pieces or windows made by the methods described above, e. g. respirator face-pieces and goggles having such eye-pieces.

In order further to describe my invention, reference is had to the accompanying drawing wherein a preferred embodiment of my invention is shown, and in which Fig. 1 is a front view of a respirator employing lenses made in accordance with my invention, and Fig. 2 is a cross-sectional view on an enlarged scale of one of the lenses prepared in accordance with my invention.

Referring to Fig. 1 of the drawing a respirator in which are employed lenses made in accordance with this invention is generally indicated by reference numeral 3 to the face-piece 4 of which are attached straps 5 adapted to hold the respirator in position on the head of the wearer. The face-piece 4 is made of rubber or other suitable flexible and gas-impervious material and has mounted in the lower portion thereof an air purifying canister 6. Although two lenses or eye-pieces 7 are shown one for each eye, it will be understood that a single large eye-piece extending across both eyes of the wearer may be used if desired.

In Fig. 2 the superficial saponification of the lens 7 is indicated by reference numeral 8. In accordance with this invention, however, either one or both of the surfaces may be saponified.

Having described my invention, what I desire to secure by Letters Patent is:

1. An article having a window and such that when in use said window is liable to be exposed on one side to a moist warm atmosphere and on the other side to a colder atmosphere, said window having a transparent closure of sheet material selected from the class consisting of organic esters of cellulose and film-forming polymerized esters of unsaturated compounds, said sheet material being saponified so that at least its inner surface is capable of absorbing moisture while the sheet as a whole is resistant to the penetration of water and gases.

2. A respirator face-piece having an eye-piece of transparent sheet material selected from the class consisting of organic esters of cellulose and film-forming polymerized esters of unsaturated compounds, said sheet material being saponified so that at least its inner surface is capable of absorbing moisture while the sheet as a whole is resistant to the penetration of water and gases.

3. An article having a window and such that when in use said window is liable to be exposed on one side to a moist warm atmosphere and on the other side to a colder atmosphere, said window having a transparent closure of sheet material of cellulose acetate, said sheet material being saponified so that at least its inner surface is capable of absorbing moisture while the sheet as a whole is resistant to the penetration of water and gases.

4. A respirator face-piece having an eye-piece of transparent sheet material of cellulose acetate, said sheet material being saponified so that at least its inner surface is capable of absorbing moisture while the sheet as a whole is resistant to the penetration of water and gases.

5. An article having a window and such that when in use said window is liable to be exposed on one side to a moist warm atmosphere and on the other side to a colder atmosphere, said window having a transparent closure of sheet material selected from the class consisting of organic esters of cellulose and film-forming polymerized esters of unsaturated compounds, said sheet material being intensely saponified over its inner surface but substantially unsaponified throughout the greater part of its thickness, whereby said material is resistant to fogging by the condensation of moisture inside the article but remains impermeable to water and gases.

6. An article having a window and such that when in use said window is liable to be exposed on one side to a moist warm atmosphere and on the other side to a colder atmosphere, said window having a transparent closure of sheet material of cellulose acetate, said sheet material being intensely saponified over its inner surface but substantially unsaponified throughout the greater part of its thickness, whereby said material is resistant to fogging by the condensation of moisture inside the article but remains impermeable to water and gases.

7. A respirator face-piece having an eye-piece of transparent sheet material of cellulose acetate, said sheet material being intensely saponified on the inner surface but substantially unsaponified throughout the greater part of its thickness whereby it is resistant to fogging by condensation of moisture inside the face-piece but is impermeable to water and gases.

8. A respirator face-piece having an eye-piece of transparent sheet material of cellulose acetate, said sheet material being intensely saponified on the inner surface and to a depth of not more than 0.01" below that surface but substantially unsaponified throughout the greater part of its thickness whereby it is resistant to fogging by condensation of moisture inside the face-piece but is impermeable to water and gases.

9. A respirator face-piece having an eye-piece of transparent sheet material of cellulose acetate, said sheet material being intensely saponified on the inner surface so as to have an affinity for cotton dyes extending to a depth of not more than 0.01" below that surface but substantially unsaponified throughout the greater part of its thickness whereby it is resistant to fogging by condensation of moisture inside the face-piece but is impermeable to water and gases.

10. An article having a window and such that when in use said window is liable to be exposed on one side to a moist warm atmosphere and on the other side to a colder atmosphere, said window having a transparent closure of sheet material of cellulose acetate of acetyl value between 52 and 56 calculated as acetic acid, said sheet material being saponified so that at least its inner surface is capable of absorbing moisture while the sheet as a whole is resistant to the penetration of water and gases.

11. A respirator face-piece having an eye-piece of transparent sheet material of cellulose acetate of acetyl value between 52 and 56 calculated as acetic acid, said sheet material being saponified so that at least its inner surface is capable of absorbing moisture while the sheet as a whole is resistant to the penetration of water and gases.

12. A respirator face-piece having an eye-piece of transparent sheet material of cellulose acetate of acetyl value between 52 and 56 calculated as acetic acid, said sheet material being intensely saponified on the inner surface so as to have an affinity for cotton dyes extending to a depth of not more than 0.01" below that surface but substantially unsaponified throughout the greater part of its thickness whereby it is resistant to fogging by condensation of moisture inside the face-piece but is impermeable to water and gases.

HENRY DREYFUS.